No. 799,553. PATENTED SEPT. 12, 1905.
G. J. GAILEY.
APPARATUS FOR TESTING BALANCE SPRINGS.
APPLICATION FILED APR. 5, 1905.
2 SHEETS—SHEET 1.
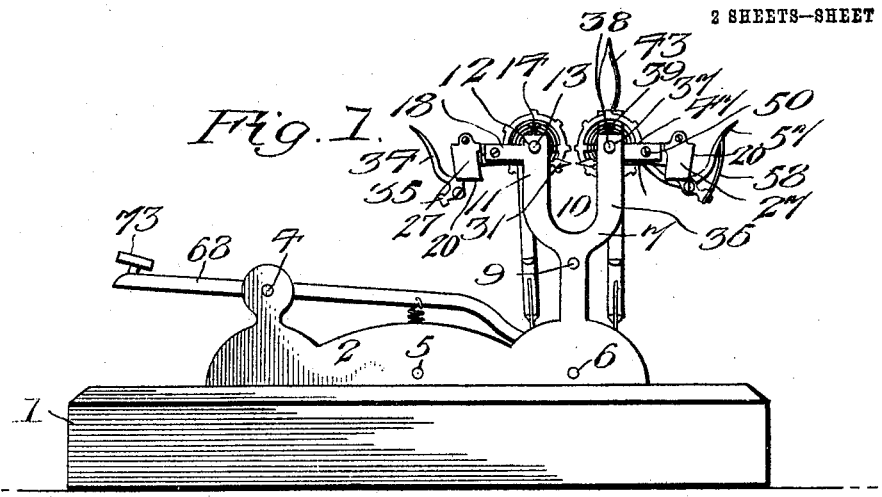
Fig. 1.
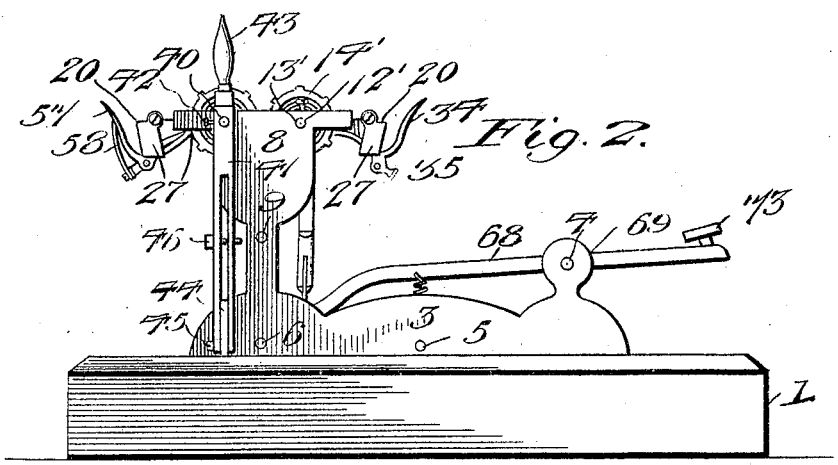
Fig. 2.
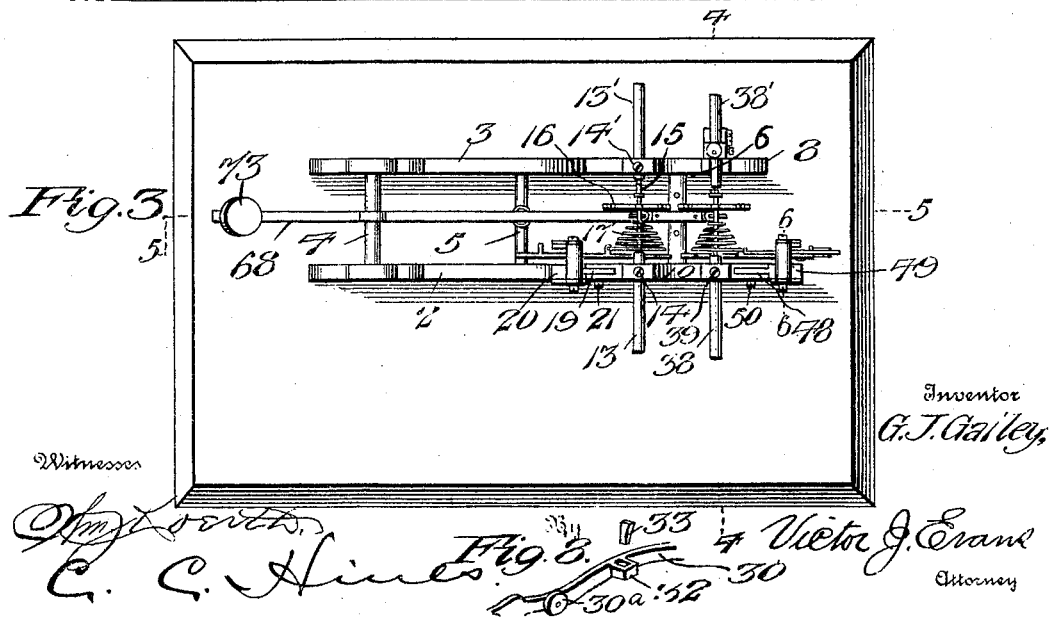
Fig. 3.
Fig. 8.
Witnesses
Inventor
G. J. Gailey,
Victor J. Evans
Attorney

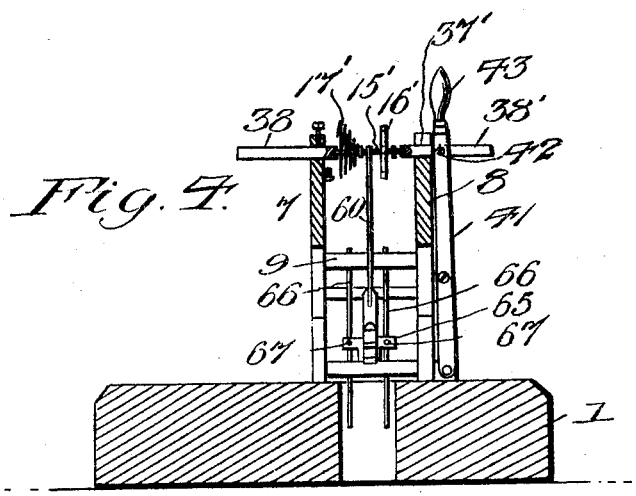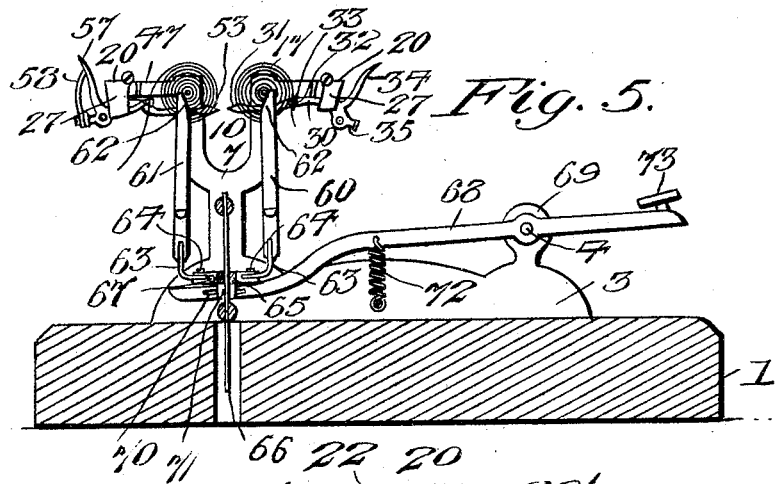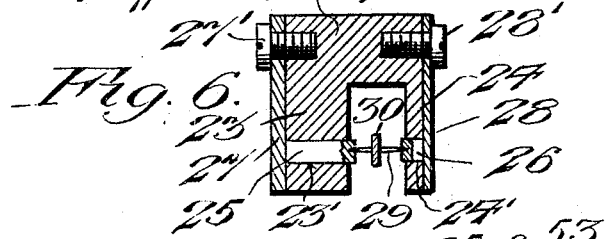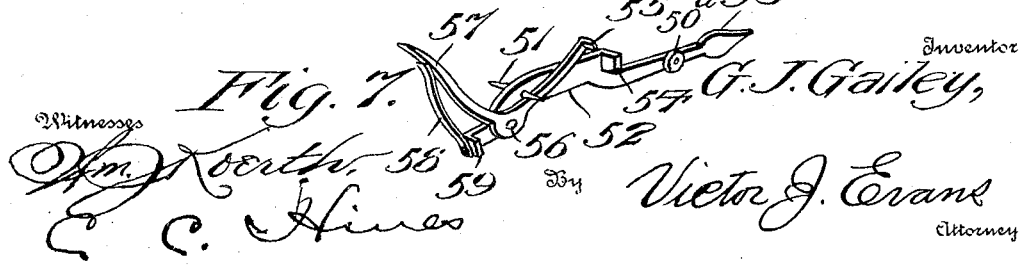

UNITED STATES PATENT OFFICE.

GEORGE J. GAILEY, OF WATERBURY, CONNECTICUT.

APPARATUS FOR TESTING BALANCE-SPRINGS.

No. 799,553.　　　Specification of Letters Patent.　　　Patented Sept. 12, 1905.

Application filed April 5, 1905. Serial No. 254,054.

*To all whom it may concern:*

Be it known that I, GEORGE J. GAILEY, a citizen of the United States, residing at Waterbury, in the county of New Haven and State of Connecticut, have invented new and useful Improvements in Apparatus for Testing Balance-Springs, of which the following is a specification.

This invention relates to an apparatus for testing the hair or balance springs of watches and other timepieces, the object of the invention being to provide a simple, efficient, and reliable apparatus by which such springs may be quickly, accurately, and conveniently tested and trued.

The preferred embodiment of the invention is illustrated in the accompanying drawings, in which—

Figure 1 is a front elevation of a testing apparatus constructed in accordance with my invention. Fig. 2 is a rear elevation of the same. Fig. 3 is a top plan view. Fig. 4 is a section on the line 4 4 of Fig. 3. Fig. 5 is a section on line 5 5 of Fig. 3. Fig. 6 is a detail section on the line 6 6 of Fig. 3. Fig. 7 is a detail perspective view of one of the vibrating indicators, and Fig. 8 is a similar view of the other indicator.

Referring now more particularly to the drawings, the numeral 1 represents a suitable base which supports the frame of the testing apparatus, the said frame comprising front and rear longitudinal plates 2 and 3, stayed and braced by transverse pins 4, 5, and 6, and front and rear standards 7 and 8, rising from the plates at one end of the frame and connected and braced by a transverse pin 9.

The standards 7 and 8 are arranged in opposing relation and are provided with enlarged upper ends for supporting the bearings and indicators of the gaging balance-wheel and spring and the balance-wheel and spring which are to be tested, the enlarged upper portion of the front standard 7 being slotted at its upper end a suitable distance downward to provide an observation slot or opening 10. The arm 11 of the yoked or Y-shaped upper end of the standard 7, produced by the formation of the slot 10, is provided at its upper end with an opening 12 for the reception of a removable and adjustable bearing-pin 13, secured in adjusted position by means of a set-screw 14, while the rear standard 8 is provided with a similar opening 12' for the reception of a coöperating bearing-pin 13', removably and adjustably secured in position by a set-screw 14'. The inner ends of the two pins 13 and 13' are recessed, as shown in Fig. 4, to form bearings for the reception of the conical journals upon the ends of the arbor 15 of a gaging or testing balance-wheel 16, to which one end of the hair or balance spring 17 is secured in the usual manner. From the arm 11 projects a lateral extension 18, which is bifurcated to receive a tongue 19 upon a supporting-bracket 20, which tongue is pivotally secured upon the said extension by a clamping-screw 21. The bracket 20 is shown in detail in Fig. 6 and comprises a body portion 22, having spaced depending arms 23 and 24, provided, respectively, with transverse openings 23' and 24' for the reception of removable bearing-blocks 25 and 26, removably retained in position by retaining or detent plates 27 and 28, pivoted upon fastening-screws 27' and 28', engaging threaded sockets in the body portion 22.

The inner ends of the blocks 25 and 26 are formed with bearing-recesses to receive tapered or cone-shaped journals upon the ends of a shaft or arbor 29, carried by a testing-vibrator 30, which is thus pivotally mounted to swing or vibrate upon the said bearing-blocks. The vibrator 30 is provided with a hand or pointer 31, projecting forwardly, so as to be visible from the front of the apparatus through the observation-opening 10, and is further provided with means for securing the free end of the testing hair-spring 17 thereto. This securing means may be of any approved construction, but, as shown in Fig. 8, comprises a lug 32, projecting inwardly from the body of the vibrator and having an opening for the reception of the free end of the spring 17, which is fastened therein by a tapered pin or key 33. In rear of the shaft or pivotal connection 29 the vibrator 30 is provided with projections or wings 34 and 35, which may be of any preferred form and arrangement, to serve as a counterbalance, as hereinafter described.

The arm 36 of the front standard 7 is provided with an opening 37 for the reception of a bearing-pin 38, adjustably and removably secured in position by a set-screw 39, and the rear standard 8 is formed with a coinciding slot 37' for the reception of a bearing-pin 38', removably and adjustably mounted in an opening 40, formed in an adjusting-lever 41 and clamped thereto by a set-screw 42. The lever 41 is provided at its upper end with a handle 43 and is slotted or bifurcated at its lower end, the arms of the bifurcated portion being arranged to straddle a supporting-lug 44, projecting from the frame-plate 3 and pivotally secured thereto by a pivot-screw 45, whereby the lever may be swung toward and from the standard 8 to adjust the bearing-pin 38' toward and from the pin 38, the slot 37 permitting the pin 38' to have movement in the arc of a circle corresponding to the swing of the lever. The arms of the bifurcated portion of the lever are adjustably connected by means of a screw 46, so that their frictional engagement with the support 44 may be regulated to maintain the lever in adjusted position, so that the pin 38' when moved inwardly to coöperate with the pin 38 will not be displaced by jars or vibrations during the operation of the machine.

The inner ends of the pins 38 and 38' are formed with bearing-recesses to receive the cone-shaped journal of the shaft or arbor 15', carrying the balance-wheel 16' and its hair or balance spring 17', which are to be tested and trued, one end of the spring 17' being fastened to the arbor 15' in the usual manner. It will thus be seen that the parts for supporting the wheel and spring to be tested correspond substantially to the parts already described, which support the gaging or testing balance-wheel 16 and its spring 17, except that the bearing-pin 38' of the first-named parts is adjustable through the instrumentality of a lever 41 in order to facilitate the insertion and removal of the parts to be tested. It will of course be understood that the gaging-spring 17, which has been tested and trued, may be mounted with its balance-wheel 16 and arbor 15 on the bearing-pins 13 and 13' for any desired period for use in the operation of the apparatus to test any number of similar springs, which with their balance-wheel and arbors are successively mounted upon the bearing-pins 38 and 38', and that quick adjustability of the parts forming the same is not, therefore, required, since the testing-spring need not be removed, except when occasion requires to determine whether or not its vibratory action remains unimpaired and also when it is desired to substitute other springs for testing hair and balance springs of different sizes. The arbor 15, with the balance-wheel and spring attached thereto, may be readily removed, however, by detaching the free end of the spring from the vibrator 30 and adjusting one or both of the bearing-pins 13 and 13' to release the journals of said shaft from the bearing-recesses thereof. Frequent relative adjustment of the bearing-pins 38 and 38' is, however, required in order to permit of the ready insertion of the springs, their balance-wheels and arbors to be tested, and for this purpose the pin 38' is connected with the adjusting-lever 41.

Projecting from the arm 36 of the front bearing 7 is a lateral extension 47, corresponding to the lateral extension 18 of the arm 11 and which receives the tongue 48 of a supporting-bracket 49, corresponding in construction to the bracket 20 (shown in detail in Fig. 6) and pivotally connected to the extension 18 by the pivot pin or screw 21, the bracket 49 being pivotally connected to the extension 47 by a pivot-pin 50. This bracket 49 is provided with bearings like the bearings 25 and 26 of the bracket 20 to receive the ends of a shaft or arbor 51, carried by a vibrator 52, comprising a plate having a hand or pointer 53 displayed at the front of the machine through the observation-slot 10 and provided with means for securing the free end of the spring 17', which is to be tested thereto. As shown in Fig. 7, the means for securing the free end of the spring to the vibrator consists of a shoulder 54, provided upon the vibrator and against which the spring is adapted to bear, together with a clamp 55, pivoted by a pin 56 to the body of the vibrator and having an angularly-arranged arm 57, against which bears a spring 58, secured at one end to an offset 59 upon the body of the vibrator, the said spring serving to force the clamp 55 toward the shoulder 54 to clamp the free end of the spring thereagainst.

It will be observed that the two vibrators or indicators 30 and 52 are similarly mounted and that their hands or pointers 31 and 53 are normally arranged in the same horizontal plane and in exact alinement, and it will be understood that in operation the two indicators or vibrators should correspond in weight, so as to be exactly calibrated. Inasmuch as the means for fastening the free ends of the springs to the two indicators or vibrators differ and the weight of the elements of the fastening in rear of the pivot of the vibrator 52 would give excess weight thereto, the projections 34 and 35 are provided upon the vibrator 30 and in practice correspond as closely as possible to the weight of the portions 57 and 58 of the vibrator 52, so that the two vibrators will swing in timed relation or unison under similar impulses or force applied thereto and will effectually correspond in action. The two vibrating indicators 30 and 52 are preferably provided with jewel contact-pieces 30ª and 50ª to engage the respective bearing-pins 13 and 38 and limit the upward movement of their respective pointers 31 and 53. As the bearing-pins and indicators are preferably made of the same kind of metal, it is necessary to prevent them from coming in direct contact, which would cause them to stick and impair their vibratory action. This difficulty is effectually overcome by the use of the jewels 30ª and 50ª.

In the practical operation of the apparatus the testing-spring and supports are mounted, as shown, upon the bearing-pins 13 and 13', while the spring to be tested and its supporting means are mounted upon the bearing-pins 38 and 38', the free ends of the two springs being connected to the respective vibrators or indicators 30 and 52, and motion is imparted to the shafts or arbors of the springs to vibrate the same, whereby vibratory motion will be transmitted to the said indicators or vibrators, the beats or vibrations being indicated by the hands or pointers 31 and 53 through the observation-slot 10. By observing the movements of these two hands the vibratory action of the two springs may be readily inspected and their timed relation determined, as it will be clear that if the two pointers vibrate in unison for a determined number of beats the spring will be in exact calibration, whereas if the movements of the pointers vary the spring which is to be tested will not be true, and will therefore require adjustment before it can be used as an adjunct to a watch or clock movement.

In order to impart movement to the two shafts or arbors, suitable actuating mechanism is provided, that shown in the present instance consisting of a pair of fingers 60 and 61, provided with beveled upper free ends 62 and straight inner faces to engage the respective arbors and yieldingly mounted at their lower ends upon supporting-springs 63, detachably secured by screws 64 to a vertically-movable carrier-head 65. The head 65 is provided with openings for the passage of a pair of guide-pins 66, removably and adjustably secured thereto by set-screws 67, and above and below the head these guide-pins slidably pass through guide-openings formed in the connecting-pins 6 and 9, whereby the head is caused to move in a true vertical path. An operating-lever 68 is fulcrumed near its outer or rear end upon the pin 4, which is carried by ears 69, projecting upward from the plates 2 and 3, and the inner or forward end of the lever projects beneath the head 65 and is provided with a longitudinal slot 70 to receive a pin 71, connecting it with the head, the pin having free movement in said slot to permit the head to have vertical movement under the rocking action of the lever. The inner or forward end of the lever is drawn downward to normally maintain the head at its lowermost position by a retracting-spring 72, and at the outer end of the lever a finger-button 73 is provided to permit the lever to be conveniently rocked to force the inner end thereof upward against the tension of the spring 22 to bring the fingers 60 and 61 into action to rotate the arbors 15 and 15'.

When the fingers 60 and 61 are forced upward by the action of the lever, the inner edges thereof come in contact with and rotate the arbors to wind up the springs 17 and 17', the springs 63 permitting the fingers to have proper engagement with the arbors without undue pressure thereon. When the finger-button 73 is released, the spring 72 restores the lever to its normal position, thus drawing down the fingers 60 and 61, which impart reverse rotation to the two arbors, thus permitting the springs to expand and vibrate. The vibrations of the respective springs are indicated by the action of the hands or pointers 31 and 53 of the two vibrators 30 and 52, whereby the operator may determine whether or not the spring 17' to be tested is properly adjusted to accord with the tested spring 17. If, for instance, the two hands or pointers vibrate in exact accordance for a period of, say, thirty beats, the spring 17 will be found sufficiently true to be used for ordinary watch-movements or timepieces. If, however, the action of the hands or pointers vary for this number of beats or are otherwise irregular, it will be apparent to the operator that the spring 17' requires adjusting, and the operations for adjusting and testing the same will be carried out until the movements of the two hands or pointers correspond for the desired number of beats and indicate that the two springs correspond in their vibratory action.

From the foregoing description, taken in connection with the accompanying drawings, the construction and mode of operation of the invention will be readily understood, and it will be seen that it provides an apparatus whereby the hair or balance springs of watches and other timepieces may be quickly, accurately, and conveniently tested and trued.

Changes in the form, proportions, and minor details of construction may be made within the scope of the invention without departing from the spirit or sacrificing any of the advantages thereof.

Having thus described the invention, what is claimed as new is—

1. A machine for testing and truing the hair or balance springs of watches, comprising supports for the arbors of a testing-spring and a similar spring to be tested, means for imparting motion to said arbors and simultaneously vibrating said springs, and vibratory indicators adapted to be attached to the free ends of the springs to move in unison therewith and indicate their respective vibrations.

2. A machine for testing and truing the hair or balance springs of timepieces, comprising supports for a testing-spring and a similar spring to be tested and their respective arbors, reciprocatory fingers for simultaneously imparting movement to said arbors and vibrating the springs, and means influenced by the springs for indicating their respective vibrations.

3. A machine for testing and truing the hair or balance springs of timepieces, comprising supports for a testing-spring and a similar spring to be tested and their respective arbors, reciprocatory spring-supported fingers for imparting motion to said arbors to simultaneously vibrate the springs, and means influenced by the springs for indicating their respective vibrations.

4. A machine for testing the hair or balance springs of timepieces, comprising supports for a testing-spring and a similar spring to be tested and their respective arbors, reciprocatory fingers for imparting motion to the arbors to vibrate the springs, yielding supports for said fingers, means for reciprocating the fingers, and means influenced by the springs for indicating their respective vibrations.

5. A machine for testing and truing the hair or balance springs of timepieces, comprising supports for a testing-spring and a similar spring to be tested and their respective arbors, means for imparting motion to the arbors to vibrate the springs, and vibrating members adapted to be attached to the free ends of the springs and to be actuated thereby, said members being provided with hands or pointers for indicating the respective vibrations of the springs.

6. A machine for testing and truing the hair or balance springs of timepieces, comprising supports for a testing-spring and a similar spring to be tested and their respective arbors, reciprocatory fingers for imparting motion to the arbors to vibrate the springs, a reciprocatory carrier for the fingers, means for guiding said carrier, an operating device for reciprocating the carrier, and means influenced by the springs for indicating their respective vibrations.

7. A machine for testing and truing the hair or balance springs of watches, comprising supports for a testing-spring and a similar spring to be tested and their respective arbors, a reciprocatory carrier, fingers yieldingly mounted upon said carrier and adapted when operated thereby to impart motion to the arbors to vibrate the springs, means for reciprocating the carrier, and means influenced by the springs for indicating their respective vibrations.

8. A machine for testing and truing the hair or balance springs of timepieces, comprising supports for a testing-spring and a similar spring to be tested and their respective arbors, means for simultaneously vibrating said springs, and pivoted vibratory members provided with means of attachment to the free ends of the springs, said members having indicating elements arranged to be simultaneously viewed to indicate the respective vibrations of the springs.

9. In a machine for testing and truing the hair or balance springs of timepieces, means for supporting a spring and its arbor comprising a frame, adjustable bearings on the frame, said bearings being adapted to support the arbor of the spring, means for imparting motion to said arbor to vibrate the spring, and an indicator provided with means of attachment to the free end of the spring and adapted to vibrate in unison therewith to indicate the vibrations thereof.

In testimony whereof I affix my signature in presence of two witnesses.

GEORGE J. GAILEY.

Witnesses:
  HENRY W. MINOR,
  L. R. CARTER.